(12) United States Patent
Fair et al.

(10) Patent No.: US 9,235,450 B2
(45) Date of Patent: Jan. 12, 2016

(54) METHOD AND APPARATUS FOR REDUCING SLOW OR STUCK SCSI COMMANDS IN A MULTI-SERVICE ENVIRONMENT AT A SCSI TARGET

(71) Applicant: EMC Corporation, Hopkinton, MA (US)

(72) Inventors: Robert L. Fair, Cary, NC (US); Shobhan Kumar Chinnam, Cupertino, CA (US)

(73) Assignee: EMC Corporation, Hopkinton, MA (US)

( * ) Notice: Subject to any disclaimer, the term of this patent is extended or adjusted under 35 U.S.C. 154(b) by 426 days.

(21) Appl. No.: 13/927,528

(22) Filed: Jun. 26, 2013

(65) Prior Publication Data

US 2015/0006777 A1 Jan. 1, 2015

(51) Int. Cl.
*G06F 9/52* (2006.01)
(52) U.S. Cl.
CPC . *G06F 9/52* (2013.01); *G06F 9/524* (2013.01)
(58) Field of Classification Search
CPC ........... G06F 9/52; G06F 9/524; G06F 9/526; G06F 17/30008
USPC ........................................................ 710/200
See application file for complete search history.

(56) References Cited

U.S. PATENT DOCUMENTS

| | | | |
|---|---|---|---|
| 5,680,645 A | 10/1997 | Russell et al. | |
| 8,838,840 B1 * | 9/2014 | Fair | G06F 11/1402 370/229 |
| 2007/0043737 A1 | 2/2007 | Nagamatsu et al. | |
| 2009/0112965 A1 * | 4/2009 | Ganesh | G06F 17/30171 709/201 |
| 2010/0153605 A1 | 6/2010 | Rogers et al. | |
| 2011/0161739 A1 | 6/2011 | Lee et al. | |
| 2012/0226673 A1 * | 9/2012 | Li | G06F 17/30171 707/704 |
| 2012/0311603 A1 | 12/2012 | Kudo et al. | |

OTHER PUBLICATIONS

Notice of Allowance, U.S. Appl. No. 13/927,492, dated Jun. 10, 2014, 18 pages.
"EMC Data Domain Boost for Symantec NetBackup OpenStorage", Best Practices Planning, EMC Data Domain Boost for Symantec OpenStorage, Feb. 2013, 45 pages.

* cited by examiner

*Primary Examiner* — Glenn A Auve
(74) *Attorney, Agent, or Firm* — Blakely, Sokoloff, Taylor & Zafman LLP

(57) ABSTRACT

A computer-implemented method to reduce slow or stuck SCSI commands at a SCSI target is disclosed. The method starts with initiating a first request to acquire an exclusive lock for a first service daemon of a SCSI target to shut down a first service, where the SCSI target offers a plurality of services, and where each service corresponds to a service daemon. The first service daemon receives a first rejection of the exclusive lock for the first request as the exclusive lock is currently held by a second service daemon corresponding to a second service. Then the first service daemon initiates a second request to acquire the exclusive lock in an attempt to shut down the first service again after a delay period. In response to a second rejection, execution of SCSI commands associated with the second service currently possessing the exclusive lock is terminated.

20 Claims, 10 Drawing Sheets

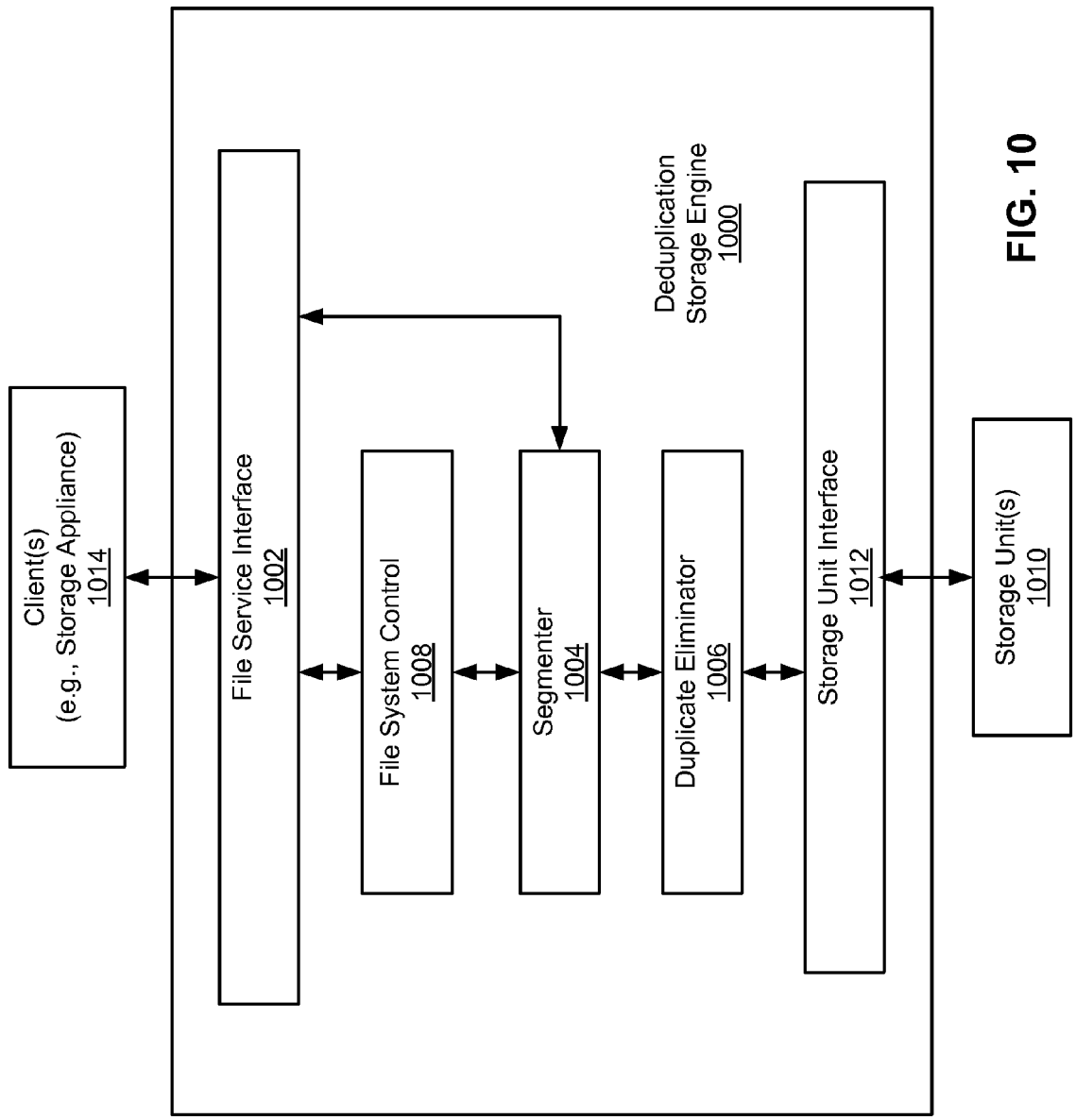

METHOD AND APPARATUS FOR REDUCING SLOW OR STUCK SCSI COMMANDS IN A MULTI-SERVICE ENVIRONMENT AT A SCSI TARGET

RELATED APPLICATIONS

This application is related to co-pending U.S. patent application Ser. No. 13/927,492, entitled "Method and Apparatus for Recovering Slow or Stuck SCSI Commands at a SCSI Target,", filed Jun. 26, 2013, which is incorporated by reference herein in its entirety.

FIELD OF THE INVENTION

Embodiments of the present invention relate generally to systems using small computer system interface (SCSI). More particularly, embodiments of the invention relate to enhancing performance of a SCSI system.

BACKGROUND

Small computer system interface (SCSI) is a set of standards for connecting and transferring data between computing systems including storage systems and peripheral computing devices. The SCSI standard defines command sets for a variety of device types and communications between the varieties of device types. Thus, it hides complexity of computing systems in communication, and makes computing systems independent from each other. In addition, SCSI provides high communication speed between computing systems (for example, ultra-640 offers interface speed at 640 MB/second). Because these features, SCSI has been popular since its inception in 1980s.

SCSI as an interface standard was limited to small computer systems at the beginning. In the early days of SCSI development, SCSI interfaces were limited to point to point system. Also SCSI supports only small number of devices (e.g., up to 8) addressable by logical unit numbers (LUNs), and it supports communication within limited distances (e.g., 25 meters in SCSI or 12 meters in ultra SCSI). Much progress has been made to move pass these limitations. For example, Internet small computer system interface (iSCSI) is an Internet Protocol (IP) based storage networking standard developed for applications such as linking data storage facilities. In an iSCSI-based system, SCSI commands are carried over IP networks, and iSCSI facilitates data transfers over intranets or the Internet and manages storage over long distance. With that, iSCSI can be used to transmit data over local area networks (LANs), wide area networks (WANs), storage area networks (SANs), or the Internet. It enables location-independent data storage and retrieval over long distances using existing network infrastructure. Thus iSCSI and other variations of SCSI have gained popularity. For this specification, iSCSI and any SCSI enhancement/variations are considered as a part of the SCSI protocol family, and the methods and apparatus disclosed herein are applicable to the SCSI protocol family.

With SCSI as a protocol family in a variety of operating environments now provides a much broader spectrum of services than originally conceived, enhancing performance of a SCSI system is desirable. Particularly, executing of SCSI commands at a SCSI target involves a variety of operations and these operations can be stuck in processing, which results in degraded performance of the SCSI target. It is desirable to reduce the happening of slow or stuck SCSI commands and also to recover gracefully upon encountering slow or stuck SCSI commands in execution at a SCSI target.

BRIEF DESCRIPTION OF THE DRAWINGS

Embodiments of the invention are illustrated by way of example and not limitation in the figures of the accompanying drawings in which like references indicate similar elements.

FIG. 10 is a block diagram illustrating a segment storage engine according to an embodiment of the invention.

DETAILED DESCRIPTION

Figure 1:
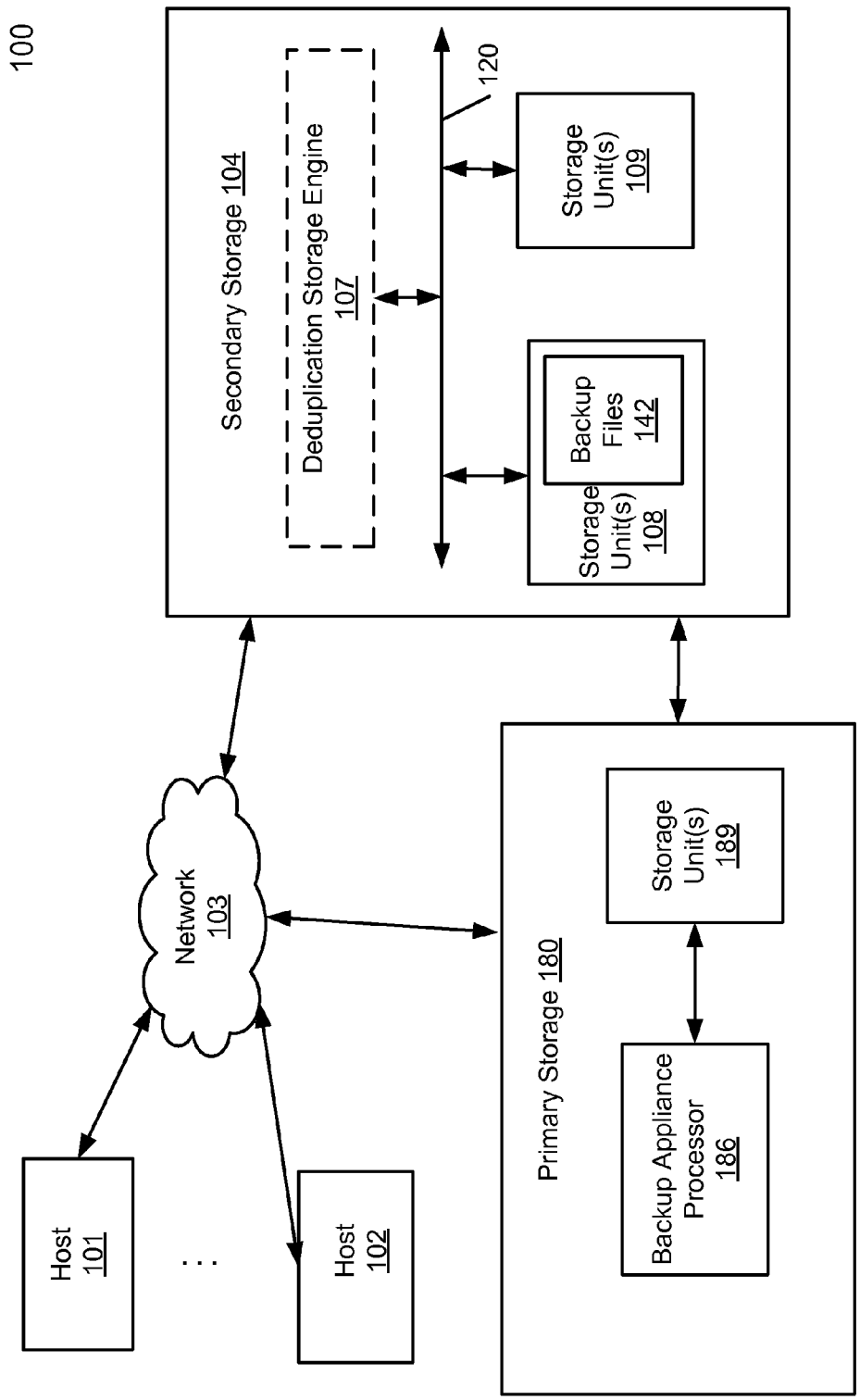
FIG. 1 is a block diagram illustrating a system for backup according to an embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. A dataset is a collection of data that is stored in a storage space in a variety of formats.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

According to some embodiments, a computer-implemented method can be utilized to recover from slow or stuck small computer system interface (SCSI) commands at a SCSI target. The method starts with monitoring execution time of an operation by a SCSI target processor within a SCSI target, where the SCSI target is communicatively coupled with a SCSI initiator through a set of communication links, where the operation is associated with a service offered by the SCSI target, and where the operation is performed for executing SCSI commands associated with the service. When the execution time of the operation exceeds a first threshold, the method proceeds with performing a first escalating action to reduce workload of the SCSI target processor. When the execution time of the operation exceeds a second threshold, the method further proceeds with performing a second escalating action that is different from the first escalating action to reduce workload of the SCSI target processor.

According to some embodiments, a SCSI target can be implemented to recover from slow or stuck SCSI commands. It contains a host bus adapter configured to couple with a set of communication links for communicating with a SCSI initiator using SCSI commands. It also contains a SCSI target processor performing operations for processing SCSI commands, where operations are associated with a set of services offered by the SCSI target. The SCSI target processor includes a SCSI target management daemon configured to monitor execution time of an operation. The SCSI target management daemon is further configured to perform a first escalating action to reduce workload of the SCSI target processor when the execution time of the operation exceeds a first threshold and perform a second escalating action that is different from the first escalating action to reduce workload of the SCSI target processor when the execution time of the operation exceeds a second threshold, where the first threshold is no larger than the second threshold.

According to some embodiments, a computer-implemented method can be utilized to reduce slow or stuck SCSI commands at a SCSI target. The method starts with initiating a first request to acquire an exclusive lock for a first service daemon of the SCSI target to shut down a first service, where the SCSI target is communicatively coupled with a SCSI initiator through a set of communication links, where the SCSI target offers a plurality of services, where each service corresponds to a service daemon, and where each service is provided at the SCSI target through executing SCSI commands initiated from the SCSI initiator. The first service daemon receives a first rejection of the exclusive lock for the first request as the exclusive lock is currently held by a second service daemon corresponding to a second service, where each of the first and the second services belongs to the plurality of services. Then the first service daemon initiates a second request to acquire the exclusive lock for the first service daemon in an attempt to shut down the first service again after a delay period. In response to a second rejection, execution of SCSI commands associated with the second service currently possessing the exclusive lock is terminated to allow the first service to acquire the lock to shut down the first service.

According to some embodiments, a SCSI target can be implemented to reduce slow or stuck SCSI commands. The SCSI target contains a host bus adapter configured to couple with a set of communication links for communicating with a SCSI initiator using SCSI commands. The SCSI target further contains a SCSI target processor performing operations for processing SCSI commands. The SCSI target processor contains a plurality of service daemons, each service daemon configured to manage a service of the plurality of services. It also contains a SCSI target management daemon configured to receive a first request to acquire an exclusive lock sent by a first service daemon to shut down a first service and the SCSI target management daemon sends a first rejection of the exclusive lock for the first request after determining that the exclusive lock is currently held by a second service daemon corresponding to a second service. The SCSI target management daemon is further configured to receive a second request to acquire the exclusive lock for the first service daemon in an attempt to shut down the first service again after a delay period. If the second service daemon still holds the exclusive lock, the SCSI target management daemon sends a second rejection, and it terminates execution of SCSI commands associated with the second service currently possessing the exclusive lock to allow the first service to acquire the lock to shut down the first service.

System Configuration

FIG. 1 is a block diagram illustrating a system for backup according to one embodiment of the invention. Referring to FIG. 1, system 100 includes, but is not limited to, one or more hosts 101-102 communicatively coupled to primary storage 180 and secondary storage 104 over network 103. Hosts 101-102 may be any type of hosts such as a server, a personal computer (e.g., desktops, laptops, and tablets), a "thin" client, a personal digital assistant (PDA), a Web enabled system, a gaming device, a media player, or a mobile phone (e.g., Smartphone), etc. Network 103 may be any type of network such as a local area network (LAN), a wide area network (WAN) such as Internet, a corporate intranet, a metropolitan area network (MAN), a storage area network (SAN), a bus, or a combination thereof, wired and/or wireless.

Both primary and secondary storage systems 180 and 104 may include any type of server or cluster of servers. For example, they may be storage servers used for any of various different purposes, such as to provide multiple users with access to shared data and/or to back up mission critical data. They may be, for example, a file server (e.g., an appliance used to provide network attached storage (NAS) capability), a block-based storage server (e.g., used to provide storage area network (SAN) capability), a unified storage device (e.g., one which combines NAS and SAN capabilities), a nearline storage device, a direct attached storage (DAS) device, a tape backup device, or essentially any other type of data storage device. Both primary and secondary storage systems 180 and 104 may have a distributed architecture, or all of their components may be integrated into a single unit. Both primary and secondary storage systems 180 and 104 may be implemented as part of an archive and/or backup storage system such as a de-duplication storage system available from EMC® Corporation of Hopkinton, Mass.

In one embodiment, primary storage 180 includes a backup appliance processor 186. Backup appliance processor 186 coordinates with primary storage 180, secondary storage 104, and hosts 101/102 to run various backup and restoration operations including replication. Backup appliance processor 186 may coordinate both backup and restoration operations. In one embodiment, backup appliance processor 186 coordinates backup and restoration operations between hosts 101/102 and primary storage 180, where the data from hosts 101/102 are backed up to and restored from storage units 189. In another embodiment, backup appliance processor 186 coordinates backup and restoration operations between primary storage 180 and secondary storage 104, where the data from storage units 189 of primary storage 180 are backed up to storage units 108-109 at secondary storage 104 (sometimes primary storage 180 and secondary storage 104 are referred to as cascaded storages). Note while backup appliance processor 186 is illustrated within primary storage 180 in FIG. 1, in some embodiments, backup appliance processor 186 is embedded within secondary storage 104 or it is embedded within a standalone backup appliance server that communicatively coupled with primary storage 180 and secondary storage 104.

Both primary storage 180 and secondary storage 104 may perform deduplication. The deduplication processes performed and storage units allocated are similar between primary storage 180 and secondary storage 104, thus only the processes and storage units within one of them are disclosed below for illustration. In one embodiment, secondary storage 104 may include, but is not limited to, deduplication storage engine 107, and one or more storage units 108-109 communicatively coupled to each other. Storage units 108-109 may be implemented locally (e.g., single node operating environment) or remotely (e.g., multi-node operating environment) via interconnect 120, which may be a bus and/or a network. In one embodiment, one of the storage units 108-109 operates as an active storage to receive and store external or fresh user data, while the other storage unit operates as a target storage unit to periodically archive data from the active storage unit according to an archiving policy or scheme. Storage units 108-109 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 108-109 may also be combinations of such devices. In the case of disk storage media, the storage units 108-109 may be organized into one or more volumes of Redundant Array of Inexpensive Disks (RAID). Backup files 142 represent data stored in storage units 108.

In response to a request to store data in storage units 108-109, optional deduplication storage engine 107 is configured to segment the data into multiple segments (also referred to as data chunks or simply chunks) according to a variety of segmentation policies or rules. Deduplication storage engine 107 only stores a segment in a storage unit if the segment has not been previously stored in the storage unit. In the event that a segment has been previously stored, metadata stores information enabling the reconstruction of a dataset using the previously stored segment. As a result, segments of datasets are stored in a deduplicated manner, either within each of storage units 108-109 or across at least some of storage units 108-109. Data stored in the storage units may be stored in a compressed form (e.g., lossless compression: Huffman coding, Lempel-Ziv Welch coding; delta encoding: a reference to a segment plus a difference; subsegmenting: a list of subsegments or references to subsegments, etc.). In one embodiment, different storage units may use different compression methods (e.g., main or active storage unit from other storage units, one storage unit from another storage unit, etc.).

The metadata may be stored in at least some of storage units 108-109, such that data can be accessed independent of another storage unit. Metadata of each storage unit includes enough information to provide access to the data it contains. When an active storage unit fails, metadata contained in another storage unit may be utilized to recover the active storage unit. When one storage unit is unavailable (e.g., the storage unit has failed, or is being upgraded, etc.), the system remains up to provide access to any data not stored in the failed storage unit. When data is deleted, the metadata associated with the data in the system is updated to reflect that the data has been deleted.

In one embodiment, the metadata information includes a data identifier, a storage unit where the segments associated with the data identifier are stored, reconstruction information for the data using the segments, and any other appropriate metadata information. In one embodiment, a copy of the metadata is stored on a storage unit for data stored on a storage unit so that data that are stored on the storage unit can be accessed using only the information stored on the storage unit. In one embodiment, a main set of metadata information can be reconstructed by using information of other storage units associated with the secondary storage in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units).

In one embodiment, each storage system as shown in FIG. 1 may be used as a tier of storage in a storage hierarchy that comprises other tiers of storage. One or more tiers of storage in this hierarchy may utilize different kinds of storage devices and/or may be optimized for different characteristics such as random update performance. Data are periodically moved among the tiers based on data management policies to achieve a cost-effective match to the current storage requirements of the datasets. For example, a data may initially be stored in a tier of storage that offers high performance for reads and writes. As the data ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Referring back to FIG. 1, backup appliance processor 186 is configured to back up data from storage unit 189 and to store the backed-up data in one or more of storage units 108-109 of secondary storage 104, where the data may be deduplicated by deduplication storage engine 107. A user (e.g., an administrator) initiates a backup request, directly or through a backup schedule, of primary storage 180.

Primary storage 180 may include any type of server or cluster of servers (e.g., remote servers). For example, primary storage 180 may be a storage server used for any of various different purposes, such as to provide multiple users with access to shared data and/or to back up mission critical data. Primary storage 180 may be, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, or essentially any other type of data storage device. Primary storage 180 may have a distributed architecture, or all of its components may be integrated into a single unit. Primary storage 180 may be implemented as part of a storage system available from EMC® Corporation of Hopkinton, Mass.

Primary storage 180 contains storage unit 189, which represent the data stored in the primary storage. Storage unit 189 may be stored across a number of logical units, and each logical unit is identified by a logical unit number (LUN). Each logical unit may contain a number of sectors. A number of consecutive sectors may be aggregated to form a block for backup data transfer. The backup data transfer in FIG. 1 complies with an implementation of SCSI thus primary storage 180 and secondary storage 104 can be viewed as a SCSI system.

A SCSI system contains at least a SCSI initiator and a SCSI target. Unlike Ethernet protocols, where two communicating parties can both initiate a communication session, the SCSI initiator is always the one initiating communication with the SCSI target in a SCSI system. In a SCSI system, a SCSI initiator initiates a communication session with a request, commonly referred to as an input/output (I/O), to a SCSI target. The SCSI target responds to the request to perform operations such as read, write, xcopy (extended copy), and etc.

A computing system, including storage systems and peripheral computing devices, can be a SCSI initiator and a SCSI target at the same time for different SCSI sessions. For example, primary storage 180 is a SCSI target when host 101 sends over data to primary storage 180 for backup. Yet primary storage 180 is a SCSI initiator when it sends over data to secondary storage 104 for backup. Without being noted otherwise, embodiments of the invention can be implemented for communications between hosts 101/102 and primary storage 180, and between primary storage 180 and secondary storage 104. Indeed, embodiments of the invention can be implemented in any SCSI system containing a SCSI initiator and a SCSI target to enhance performance of the SCSI system.

Figure 2:
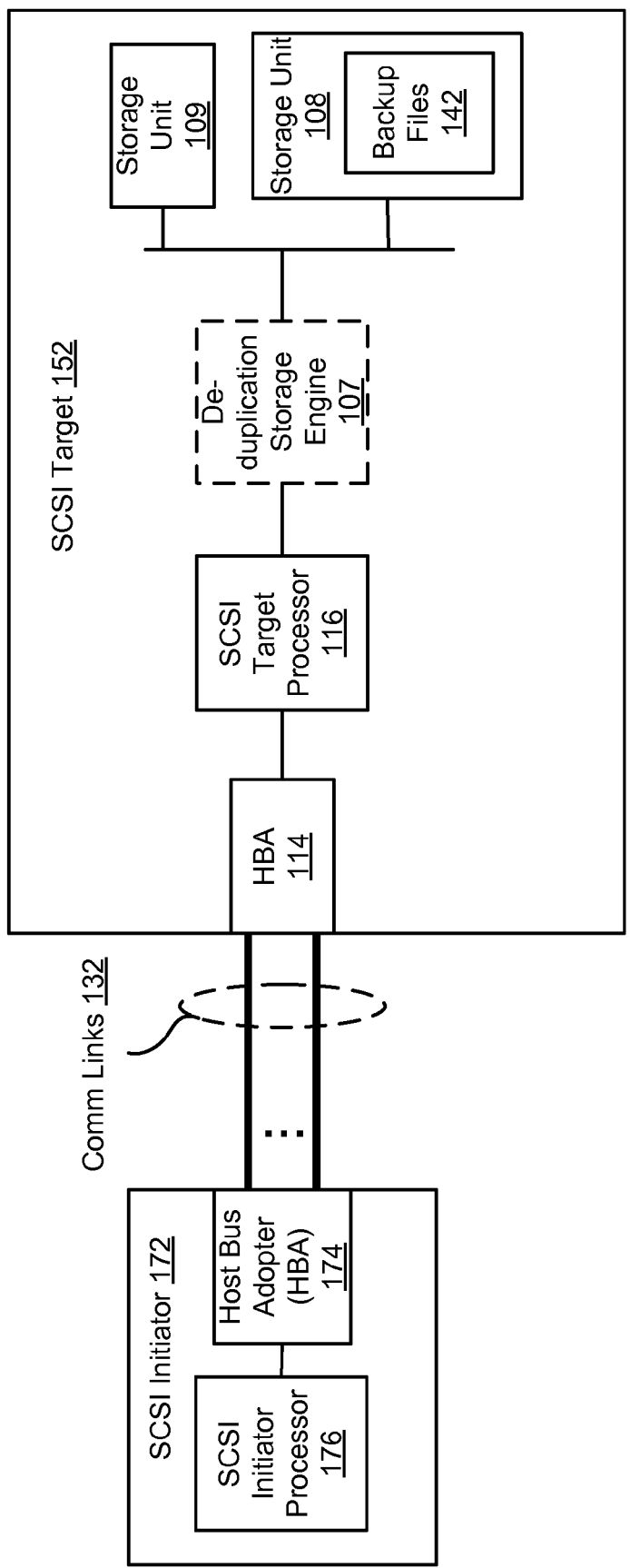
FIG. 2 is a block diagram illustrating a SCSI system.

FIG. 2 is a block diagram illustrating a SCSI system. In one embodiment, system 200 is a zoom-in of a portion of system 100 in FIG. 1 with components/entities not essential to the application not shown. System 200 may represent hosts 101/102 (SCSI initiator 172 of FIG. 2) and primary storage 180 (SCSI target 152 of FIG. 2), and it may also represent primary storage 180 (SCSI initiator 172 of FIG. 2) and secondary storage 104 (SCSI target 152 of FIG. 2).

SCSI initiator 172 contains SCSI initiator processor 176 and host bus adapter (HBA) 174. SCSI initiator processor 176 may be implemented as a part of backup appliance processor 186 of FIG. 1 but it may also be implemented as a standalone processor coordinating SCSI communication with SCSI target 152. HBA 174 is the input/output interface through which SCSI initiator 172 communicates with SCSI target 152. That is, commands, data, status and messages are transmitting to and from HBA 174 for SCSI initiator processor 176 to process. Note while HBA is illustrated, the embodiments of the invention are not limited to any specific SCSI I/O interface and they apply to other types of SCSI I/O interfaces (e.g., converged network adapters (CANs)).

SCSI target 152 contains SCSI target processor 116, target HBA 114, and storage units 108-109. Optionally, SCSI target 152 may also contain deduplication storage engine 107. Deduplication storage engine 107 and storage units 108-109 serve the same functions as the blocks with the same references as in FIG. 1. SCSI target processor 116 is the processor coordinating SCSI communication with SCSI initiator 172 and performing a variety of operations to process SCSI commands. Target HBA 114 is the input/output interface through which SCSI target 152 communicates with SCSI initiator 172. Through target HBA 114 and initiator HBA 174, SCSI target 152 and SCSI initiator 172 are communicatively coupled with each other through a set of communication links, communication links 132.

Communication links 132 may be built using a variety of media. The medium may be made of optical fibers. Communication links 132 may be fiber channels (FCs) and SCSI initiator 172 communicates with SCSI target 152 through a storage area network (SAN). Fiber channel protocol (FCP) is then utilized for communication between SCSI initiator 172 and SCSI target 152. When communication links 132 passes through an Ethernet network, a different protocol, such as fiber channel over Transmission Control Protocol/Internet Protocol (TCP/IP) (FCIP) may be utilized for communication between SCSI initiator 172 and SCSI target 152. The medium may also be made of copper and communication links 132 are copper wires (such as twisted pairs) or other suitable media. Both FCP and FCIP may be utilized for the communication between the two parties with other media. Communication links 132 may contain a set of one or more links.

Operations of a SCSI Target Processor

Figure 3:
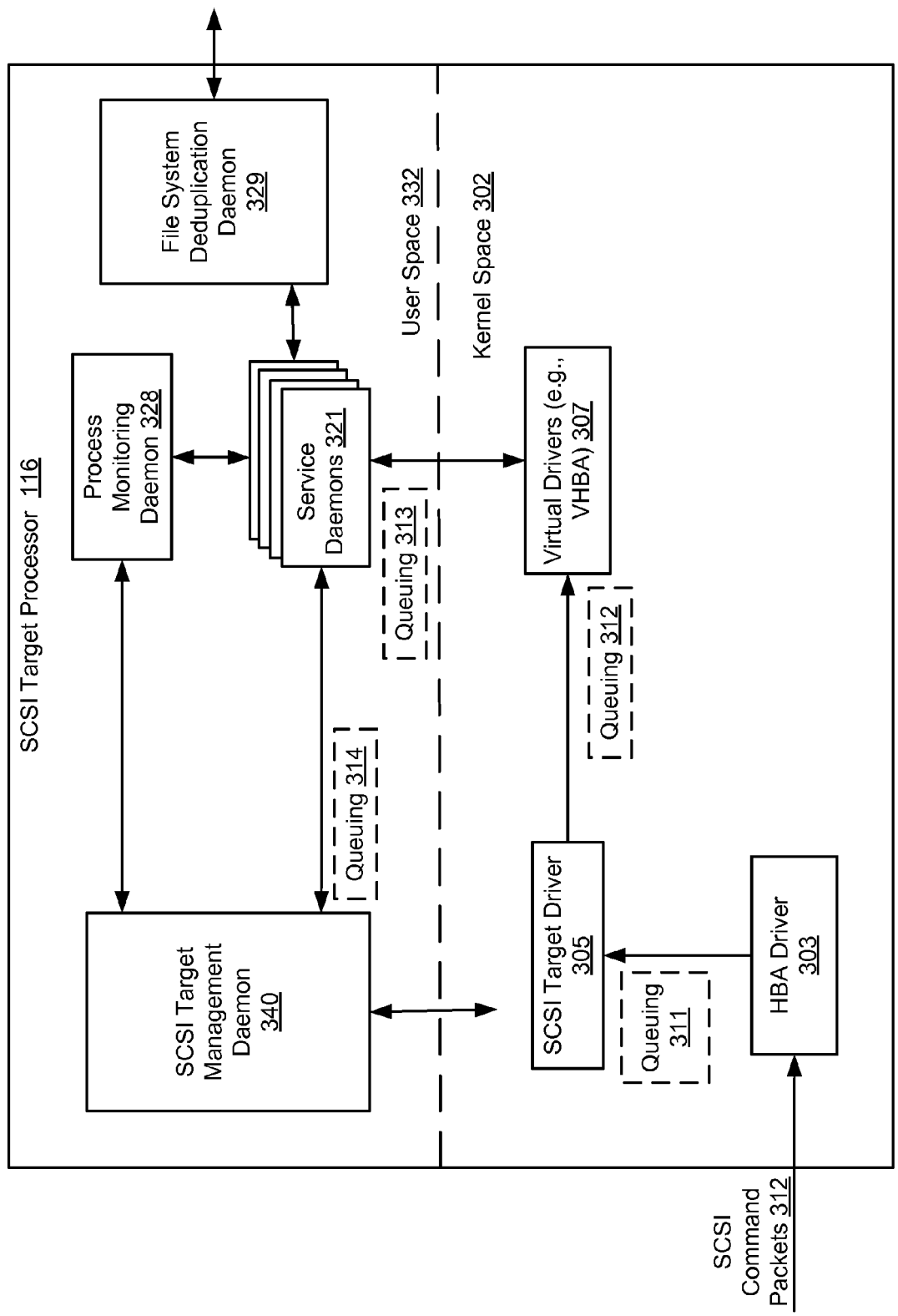
FIG. 3 is a block diagram illustrating operations within a SCSI target processor according to an embodiment of the invention.

FIG. 3 is a block diagram illustrating operations within a SCSI target processor according to an embodiment of the invention. The operations are for the SCSI target processor with illustrated modules but embodiments of the invention are not limited to a specific SCSI target processor with the illustrated modules. A SCSI target processor with more or less modules may perform more, less, or different functions to implement the principle of the invention disclosed herein.

At a SCSI target, SCSI commands are received at an I/O interface (e.g., Target HBA 114 of FIG. 2) of the SCSI target. The received SCSI commands are then passed to a SCSI target processor for processing. Referring to FIG. 3, SCSI target processor 116 receives SCSI commands formatted as SCSI command packets 312 and processes these packets.

SCSI target processor 116 interacts with memories that may be divided into two spaces conceptually, user space 332 and kernel space 302. A computer operating system usually segregates virtual memory into a kernel space and a user space. Kernel space is strictly reserved for running the kernel, kernel extensions, and most device drivers. In contrast, user space is the memory area where all user mode applications work and this memory can be swapped out when necessary. The user mode applications access kernel space through system calls.

Referring to FIG. 3, SCSI command packets 312 enters SCSI target processor 116, which is processed by host bus adapter (HBA) driver 303. The SCSI command packets are then passed to SCSI target driver 305. SCSI target driver 305 is responsible to route the SCSI command packets in kernel space 302. For example, SCSI target driver 305 routes the SCSI command packets to virtual drivers 307. SCSI target driver 305 may also determine that a SCSI command should not be routed (e.g., the SCSI command comes from a SCSI initiator not coupled to the SCSI target). Virtual drivers 307 can be implemented in a variety of ways, and in one embodiment, it is implemented as a virtual host bus adapter (VHBA). Virtual drivers 307 accept SCSI commands and make them available to user space 332 (e.g., through a file descriptor).

At user space 332, a variety of services take the SCSI commands made available by virtual drivers 307 and process them and provide responses of the SCSI commands to the SCSI initiator sending the SCSI commands. The variety of services each has its own daemon, illustrated as service daemons 321. Service daemons 321 performs functions such as configuring services, responding to hardware/software activities relating to the services, running scheduled tasks, and performing other tasks. Each service has its own daemon because SCSI commands are processed differently depending on services. Service daemons 321 interact with file system deduplication daemon 329 to access data stored in a deduplicated storage.

The variety of services includes services providing storage virtualization such as virtual tape library (VTL) and virtual disks. Virtual tape libraries provide an alternative to physical tape libraries. The virtual tape libraries appear to be physical tape libraries to the applications. These virtual tape libraries may emulate physical tape libraries including all of the SCSI commands utilized by for example backup programs to interact with the physical tape libraries. However, the virtual tape libraries typically do not actually store the data on physical magnetic tapes, but rather store the data on one or more hard disk drive arrays, solid state storage devices, or other types of physical storage. This offers an advantage that the virtual tape libraries do not need to rely on the mechanical components, such as robotic arms used for physical tape libraries. Moreover, backup applications or other software utilizing the virtual tape library, do not need to know that physical magnetic tapes are not being used for data storage, and do not need to be changed. This helps to avoid modifying existing backup applications and technology that has been designed to use physical tape libraries. As a further advantage, the data stored by a backup application to a virtual tape may be stored as a file of a file system. As such, the virtual tape libraries are generally able to take advantage of advanced file system functionalities, such as improved ability to perform data deduplication, replication, redundancy, segmenting, and/or other file system based technologies.

SCSI target management daemon 340 is a module configured to monitor execution of SCSI commands within SCSI target processor 116. SCSI target management daemon 340 receives service state update of service daemons 321 and it monitors initiation and exit of these service daemons. For example, SCSI target management daemon 340 monitors service daemons 321 for:

Add a SCSI device;
Remove a SCSI device;
Create an access group to access data stored (e.g., in a VTL);
Destroy an access group;
Add an LUN to an access group;
Remove an LUN from an access group;
Modify an LUN in an access group;
Add an SCSI initiator to an access group; and
Remove an SCSI initiator from an access group.

Process monitoring daemon 328 is a module responsible for terminating and initiating a service daemon. In one embodiment, process monitoring daemon detects exit of a service daemon and reinitiates it after a period of time (e.g., two minutes).

For some management commands, such as adding devices, adding devices to access groups requires an exclusive lock to SCSI target management daemon 340. These operations are non-interruptible and blocking, and they may delay performing functionalities such as signal delivery, which in turn reduces the ability to perform other concurrent operations. Also, SCSI commands may be queued in multiple places within kernel space 302 and service space 332 waiting for execution. For example, the SCSI commands may be waiting for processing at SCSI target 305, virtual drivers 307, and they may also be waiting for processing by service daemons 321 within user space 332 as illustrated by queuing 311-313 respectively in FIG. 3.

In addition, interactions between SCSI target management daemon 340 and service daemons 321 may be slow or stuck. For example, SCSI target management daemon 340 may perform slow or stuck system calls, which results in SCSI target management daemon 340 in a locked state for an extended period, for example it may take a long time to clean up after a failed service daemon. The waiting of execution of operations by SCSI target management daemon 340 is illustrated by queuing 314.

The embodiments of the invention aim at preventing slow and stuck SCSI command processing at a SCSI target processor and also providing mechanisms to recover from slow and stuck SCSI commands.

Embodiments of Toggling SCSI Command Acceptance

Figure 4:
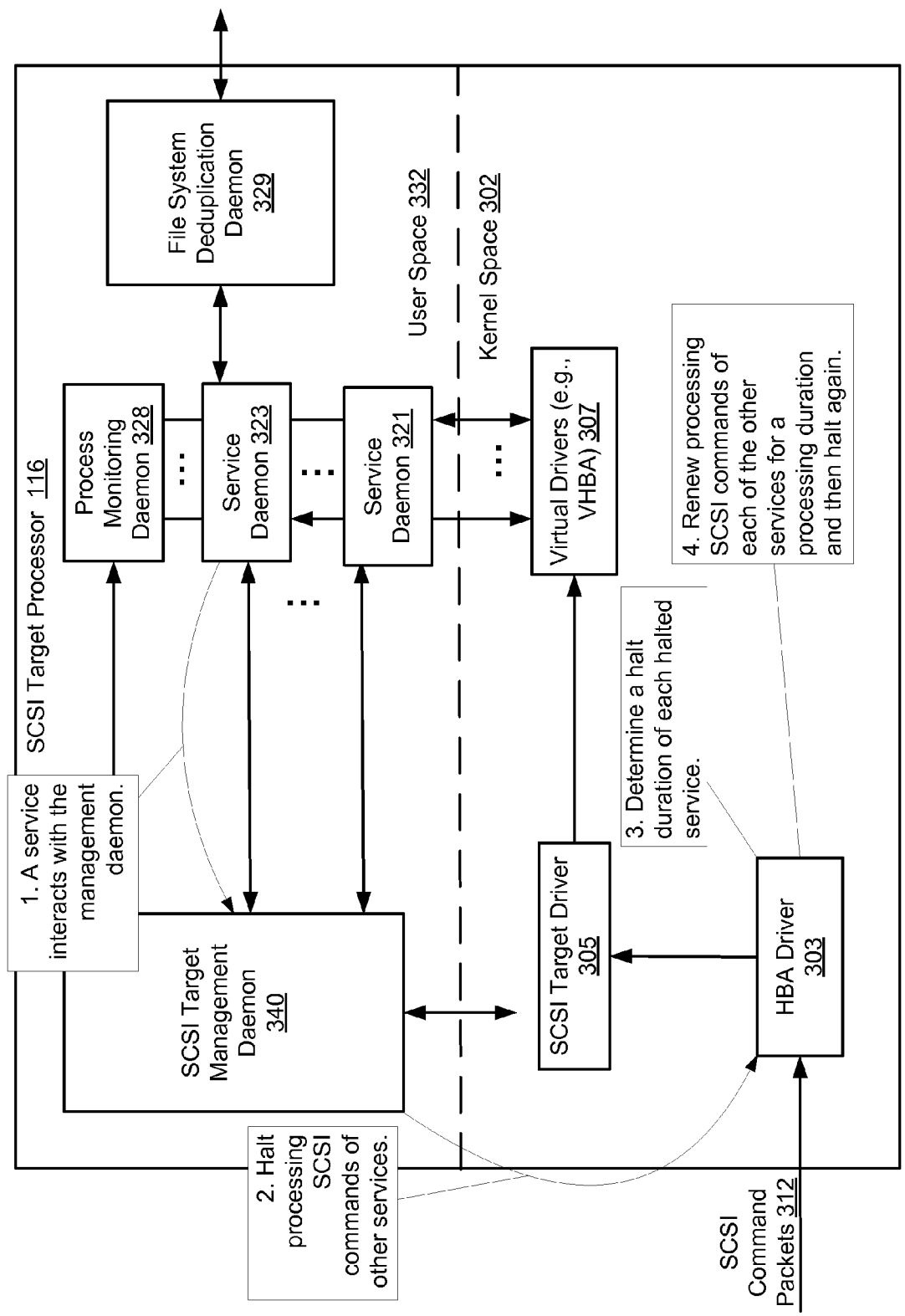
FIG. 4 illustrates toggling SCSI command acceptance within a SCSI target processor according to an embodiment of the invention.

FIG. 4 illustrates toggling SCSI command acceptance within a SCSI target processor according to an embodiment of the invention. The SCSI target processor of FIG. 4 is similar to the SCSI target processor of FIG. 3, and the same or similar references indicate elements or components having the same or similar functionalities. In FIG. 4, two service daemons, service daemons 321 and 321 are illustrated to shown operations of the SCSI target processor supporting more than one service.

Task boxes 1 to 4 illustrate the order in which operations are performed according to one embodiment of the invention. At task box 1, service daemon 323 performs operations requiring interactions with SCSI target management daemon 340. The operations include service configuration or recovery of the service corresponding to service daemon 323, during which concurrent operations for other services often cause delays to complete operations for service daemon 323. In one embodiment, these operations for service daemon 323 require an exclusive lock of SCSI target management daemon 340. To alleviate the possible delay and/or stuck operations, SCSI target management daemon 340 halts processing of SCSI commands of any other services at task box 2. In the illustrated embodiment, since HBA driver 303 takes SCSI command packets 312 from HBA, it is asked to stop processing SCSI commands of services other than the service corresponding to service daemon 323. With less SCSI commands to process, modules within SCSI target processor 116 are less likely congested and queuing at different spots within the processor is reduced, thus the likelihood of slow or stuck SCSI commands is reduced.

The preventative measure for the service corresponding to service daemon 323 facilitates completion of operations for the service. For example, it allows its configuring and starting up to finish without concurrent operations of other services. Yet the halt of processing SCSI commands of other services has a negative consequence to the other services. The halt likely results in the SCSI target sending busy responses to one or more SCSI initiator sending the SCSI commands of the other services. When a SCSI initiator receives a busy response for extended period of time (e.g., 45 seconds), the SCSI initiator may send out an abort management command (a type of command for managing the SCSI system), asking the SCSI target to abort processing commands. The abort management command causes the SCSI target to abort all commands pending to be processed. Then the SCSI initiator will resend these aborted commands in addition to new commands generated after the earlier commands were first sent out, which would cause the SCSI target to be busy to process a bigger command batch. Thus, the halt of processing SCSI commands of other services may deteriorate performance of the SCSI target if the halt lasts an extended period of time.

Thus at task box 3, it is determined how long a service has been halted for processing commands. Once the halt duration reaches a threshold (e.g., 30 seconds), the SCSI target renews processing the commands of the service for a processing duration (e.g., 2 seconds), and then it halts processing the commands of the service again at task box 4. The "toggling" of processing the SCSI commands of the other services continues until the operations for service daemon 323 completes and SCSI target management daemon 340 is no longer busy with service daemon 323. In one embodiment, the toggling completes when service daemon 323 releases an exclusive lock to SCSI target management daemon 340.

Figure 5:
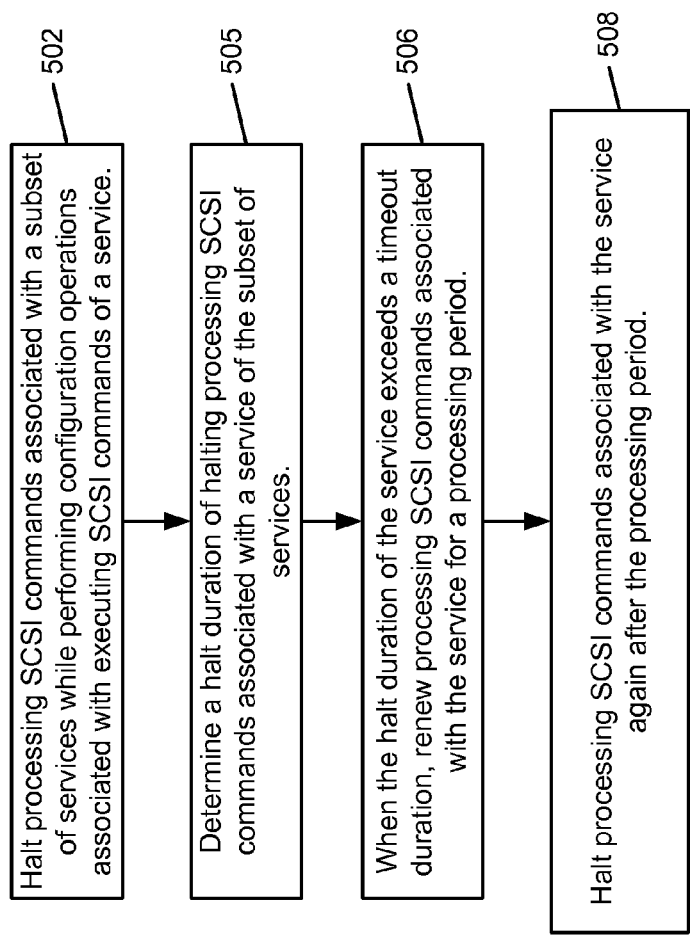
FIG. 5 is a flow diagram illustrating toggling SCSI command acceptance within a SCSI target processor according to an embodiment of the invention.

FIG. 5 is a flow diagram illustrating toggling SCSI command acceptance within a SCSI target processor according to an embodiment of the invention. The flow diagram is performed in a SCSI target processor. The SCSI target processor is the processor of a SCSI target, which is communicatively coupled with a SCSI initiator through a set of communication links. The SCSI target supports a variety of services such as VTL and virtual disk.

At block 502, when the SCSI target processor is performing configuration operations associated with executing SCSI commands of a service (first service), it halts processing SCSI command associated with a subset of services (excluding the first service) supported by the SCSI target. The configuration operations associated with executing SCSI command of the first service include a service startup, recovery, shutdown, or other configuration operations. In one embodiment, the subset of services is all other services supported by the SCSI target except the first service performing configuration operations.

At block 504, the SCSI target processor determines a halt duration of halting processing SCSI commands associated each service of the subset of services. At block 506, when the halt duration of halting processing SCSI commands for a particular service exceeds a timeout duration, the SCSI target processor renews processing SCSI commands associated with the particular service for a processing period. In one embodiment, the timeout duration is selected partially based on how long a coupled SCSI initiator will be in normal transmission state without timeout with receiving busy responses for SCSI commands sent to the SCSI target. The timeout duration is between 30 and 90 seconds in one embodiment.

Then at block 508, the SCSI target halt processing SCSI commands associated with the particular service again after the processing period. The processing period generally is a period much shorter than the timeout duration. In one embodiment, the processing period is around two seconds. The processing period for the particular service prevents the coupled SCSI initiator from timeout. In one embodiment, the SCSI target stops performing configuration operations associated executing SCSI commands of the first service while the SCSI target renews processing SCSI command associated with the particular service.

Note the toggling of processing SCSI commands in blocks 504-508 stops once the configuration operations associated with executing SCSI commands of the first service. The toggling of processing SCSI commands prevents a known cause of slow or stuck SCSI commands from deteriorating a SCSI target's performance due to concurrent operations and it is an effective preventative measure to avoid slow or stuck SCSI commands at a SCSI target.

Embodiments of Reducing Slow or Stuck Commands of Another Service

Figure 6:
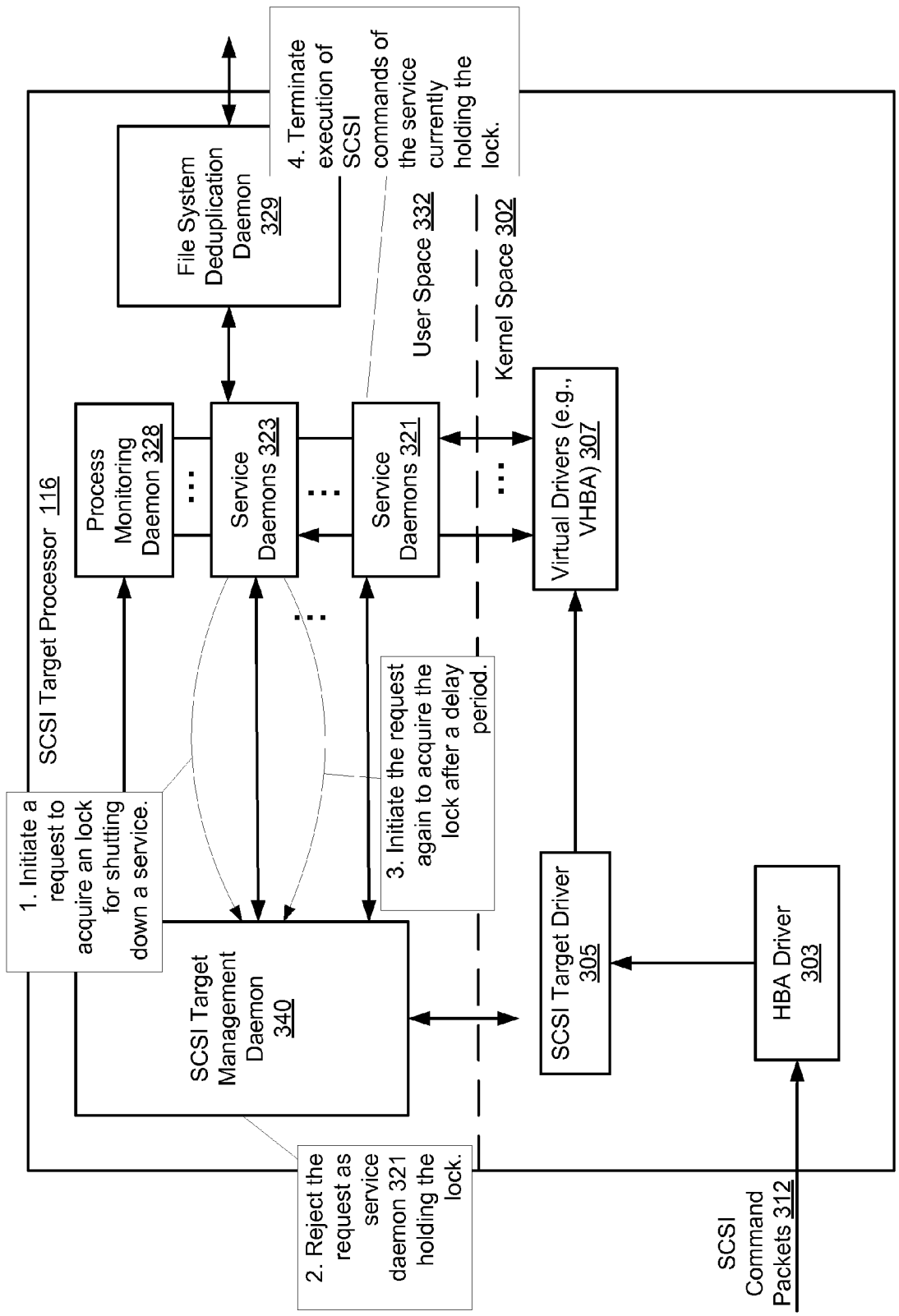
FIG. 6 illustrates reducing slow or stuck SCSI commands of another service within a SCSI target processor according to an embodiment of the invention.

FIG. 6 illustrates reducing slow or stuck SCSI commands of another service within a SCSI target processor according to an embodiment of the invention. The SCSI target processor of FIG. 6 is similar to the SCSI target processor of FIG. 4, and the same or similar references indicate elements or components having the same or similar functionalities.

Task boxes 1 to 4 illustrate the order in which operations are performed according to one embodiment of the invention. At task box 1, service daemon 323 requests an exclusive lock of SCSI target management daemon 340 to perform operations to shut down the service corresponding to service daemon 323. At task box 2, SCSI target management daemon 340 rejects the request as service daemon 321 corresponding to another service holds the lock for its operations. The exclusive lock is often used for configuration operations such as service startup, recovery, and shutdown the service corresponding to service daemon 323. Note in one embodiment, service daemon 323 is marked with a shutdown delay flag after the rejection at task box 2 so that SCSI target management daemon 340 knows service daemon 323 is in waiting for the exclusive lock.

After receiving the rejection, service daemon 323 waits for a delay period and then initiates the request for the exclusive lock of SCSI target management daemon 340 again at task box 3. If it receives the lock, it will interact with SCSI target management daemon 340 and shut down the service the service corresponding to service daemon 323. If the request is rejected again, a process is initiated at task box 4 to shut down the service corresponding to service daemon 321, which holds the exclusive lock of SCSI target management daemon 340. At task box 4, execution of SCSI commands relating to the service corresponding to service daemon 321 is terminated and the service is to be shut down. The rationale is that a long period of holding the exclusive lock of SCSI target management daemon 340 indicates that the service contains slow or stuck SCSI commands thus it needs to be shut down so that service daemon 323 may take the exclusive lock, which will release the exclusive lock once it completes its own shutdown. As illustrated, embodiments of invention here terminate another service currently holding the exclusive lock of SCSI target management daemon 340 to reduce slow or stuck SCSI commands at the SCSI target.

Note process monitoring daemon 328 terminates and initiates a service daemon and it will restart service daemon 321 after a period (e.g., two minutes after its shutdown). Also note that with service daemon 323 shutting down through interactions with SCSI target management daemon 340, SCSI target processor 116 may utilize embodiments of toggling SCSI command acceptance disclosed herein above to reduce the workload of the SCSI target.

Figure 7:
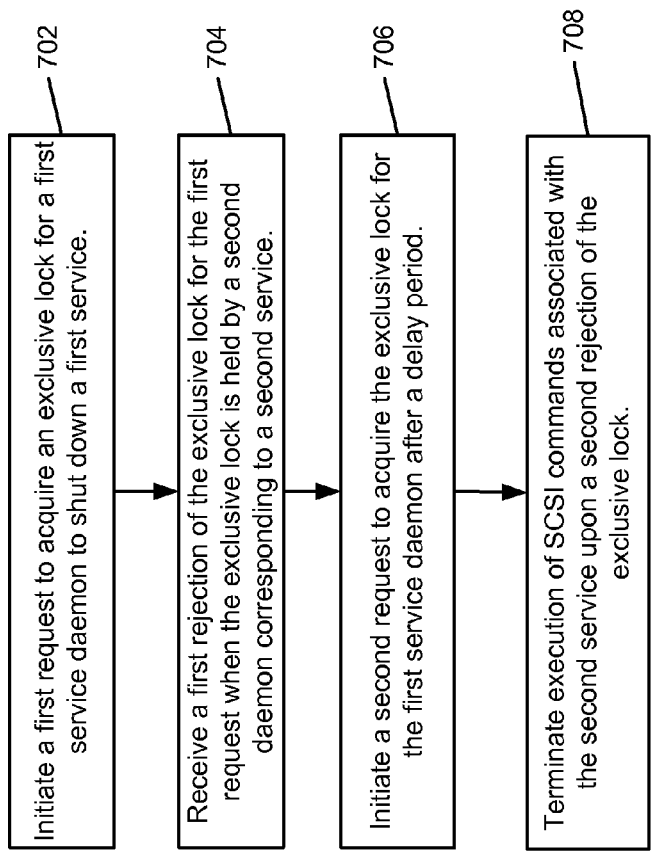
FIG. 7 is a flow diagram illustrating reducing slow or stuck SCSI commands of another service at a SCSI target processor according to an embodiment of the invention.

FIG. 7 is a flow diagram illustrating reducing slow or stuck SCSI commands of another service at a SCSI target processor according to an embodiment of the invention. The flow diagram is performed in a SCSI target processor. The SCSI target processor is the processor of a SCSI target, which is communicatively coupled with a SCSI initiator through a set of communication links. The SCSI target support a variety of services such as VTL.

At block 702, a service daemon initiates a first request to acquire an exclusive lock to shut down a first service. At block 704, it receives a first rejection of the exclusive lock for the first request when the exclusive lock is held by a second daemon corresponding to a second service. Then the service daemon initiates a second request to acquire the exclusive lock again after a delay period at block 706. The delay period is configurable and depends on factors such as SCSI system configuration and performance requirement.

Note in one embodiment, the service daemon is marked with a shutdown delay flag in response to receiving the first rejection. If the second request is successfully accepted, the service daemon will take the exclusive lock and shut down the service. Afterward, the service daemon releases the exclusive lock.

If the second request is rejected again, at block 708, the execution of SCSI commands associated with the second service is terminated and the second service daemon is shut down. The second service daemon will be restarted (e.g., by a process monitoring daemon) after a period following the termination. Note the termination of the second service may utilize embodiments of toggling SCSI command acceptance disclosed illustrated in FIGS. 5 and 6. For example, while terminating the second service, the SCSI target may halt processing SCSI commands associated with a subset of services excluding the second services temporarily. When the halt duration for a service within the subset of services reaches a timeout duration, the SCSI target renews processing SCSI commands associated with the service for a processing period and then halts processing SCSI commands associated with the service again until the second service is terminated.

Embodiments of Recovering from Slow or Stuck SCSI Commands

The embodiments of invention disclosed herein above reduce slow or stuck SCSI commands in a multi-service environment at a SCSI target. They involve coordination of operations of multiple services, such as toggling SCSI command acceptance of one or more services at a SCSI target to improve performance of the SCSI target for a different service, or terminating one service for another service with operations waiting to be processed. In contrast, the embodiments below recover from slow or stuck SCSI commands of one service to minimize impact of other services supported by a SCSI target.

Figure 8:
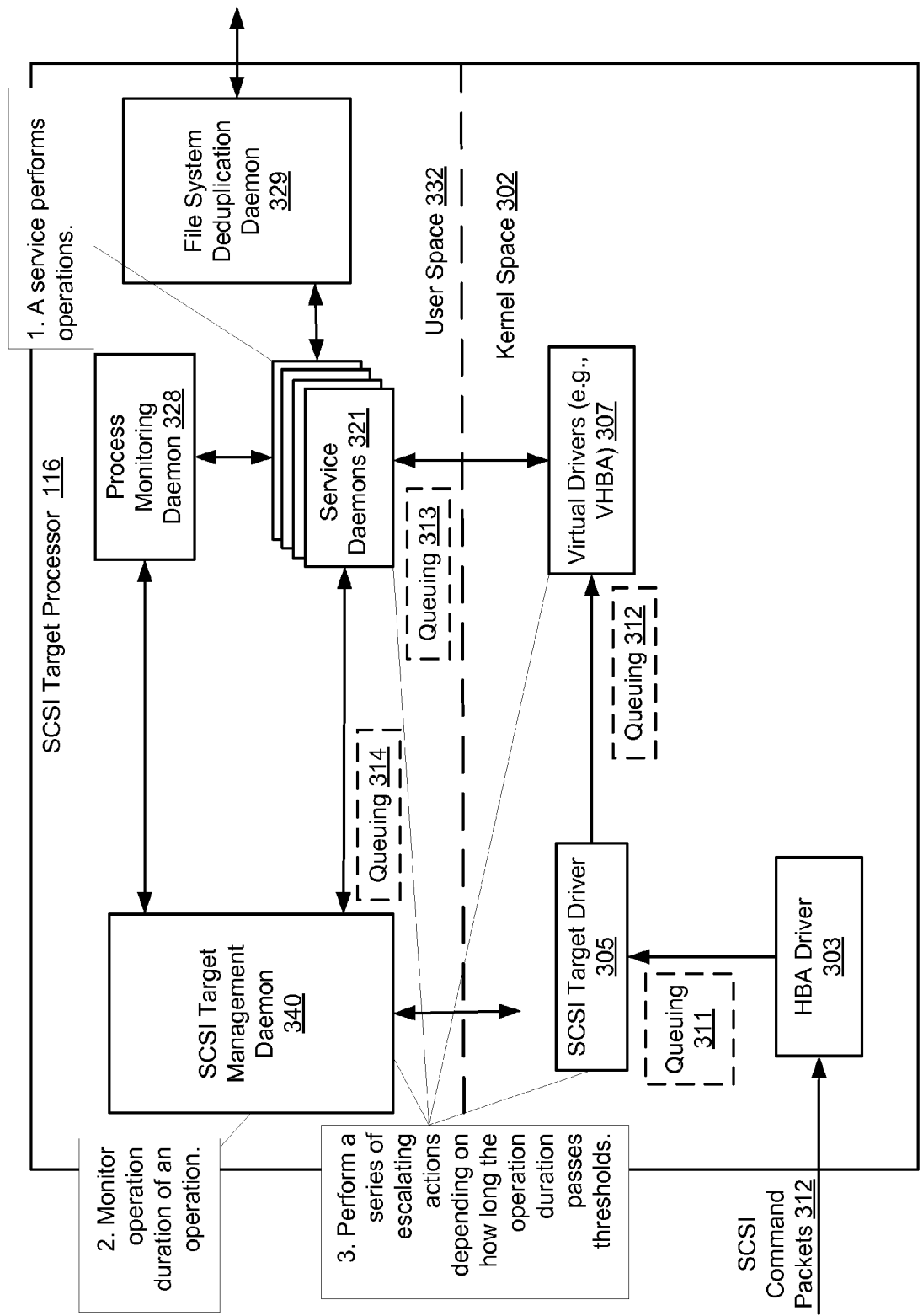
FIG. 8 illustrates recovering from slow or stuck SCSI commands within a SCSI target processor according to an embodiment of the invention.

FIG. 8 illustrates recovering from slow or stuck SCSI commands within a SCSI target processor according to an embodiment of the invention. The SCSI target processor of FIG. 8 is similar to the SCSI target processor of FIG. 3, and the same or similar references indicate elements or components having the same or similar functionalities.

Task boxes 1 to 3 illustrate the order in which operations are performed according to one embodiment of the invention. At task box 1, service daemon 321 corresponding to a service performs operations for the service. At task box 2, SCSI target management daemon 340 monitors operation duration of operations performed for the services. With the SCSI target support one or more services, and each service may perform multiple operations within the SCSI target for processing associated SCSI commands, SCSI target management daemon 340 may monitor many concurrent operations. In one embodiment, each monitored operation is associated with a wait duration, and the wait duration may be different for different operations and for operations associated with different services.

At task box 3, depending on how long operation duration of the operation passes a set of thresholds, SCSI target management daemon performs a series of escalating actions to recover the SCSI target from slow or stuck SCSI commands. The set of thresholds may be set to be a multiple of the wait duration, and the set of escalating actions includes actions ranging from affecting the service performing the operation only to all services offered by the SCSI target. Table 1 below illustrates an embodiment of the set of thresholds and the set of escalating actions. The wait duration is set to be around 20 seconds and the thresholds are multiples of the wait duration except the last threshold. Each threshold has a corresponding recovery action performed for recovery.

TABLE 1

Escalating Recovering Actions for Slow/Stuck SCSI Commands

| # | Thresholds | Recovery Actions |
|---|---|---|
| 1 | 2× | Remove VHBA messages for the service |
| 2 | 3× | Remove messages at SCSI target for the service |

TABLE 1-continued

Escalating Recovering Actions for Slow/Stuck SCSI Commands

| # | Thresholds | Recovery Actions |
|---|---|---|
| 3 | 5× | Remove VHBA messages for all services |
| 4 | 15 minutes | Trigger kernel diagnostics |

As illustrated in Table 1, when an operation has taken more than 40 seconds (2×20 wait duration=40), the SCSI target processor removes VHBA messages for the service (the removing operation is often referred to as "flushing"). That is, the SCSI target processor reducing queuing 312 of FIG. 8 by eliminating queued messages for the service. When the operation has taken more than 60 seconds (3×20 wait duration=60), the SCSI target processor removes messages at the SCSI target driver for the service. That is, the SCSI target processor reducing queuing 311 of FIG. 8 by eliminating messages for the service. If the operation has taken more than 100 seconds (5×20 wait duration=100), the SCSI target processor removes VHBA messages for all services supported by the SCSI target. That is, the SCSI target processor de-queues all messages at queuing 312 of FIG. 8 to recover from slow or stuck SCSI commands. If all these recovery actions do not stop the operation from continuing, the SCSI target triggers a kernel diagnostic after the operation has taken more than 15 minutes. The sequence of recovery actions illustrates an escalating path: The longer an operation causing stuck, the more intrusive the recovery action becomes. Note the set of thresholds and the set of escalating actions are for illustration only, and other sets of thresholds and set of corresponding escalating actions can be implemented applying the underlying principle disclosed herein.

Note embodiments of recovery actions may incorporate embodiments of toggling of processing SCSI commands and/or embodiments of reducing slow or stuck commands of other services. For example, when SCSI target removing messages for the service at the SCSI target driver, it may temporarily halt processing incoming SCSI commands of other services.

Figure 9:
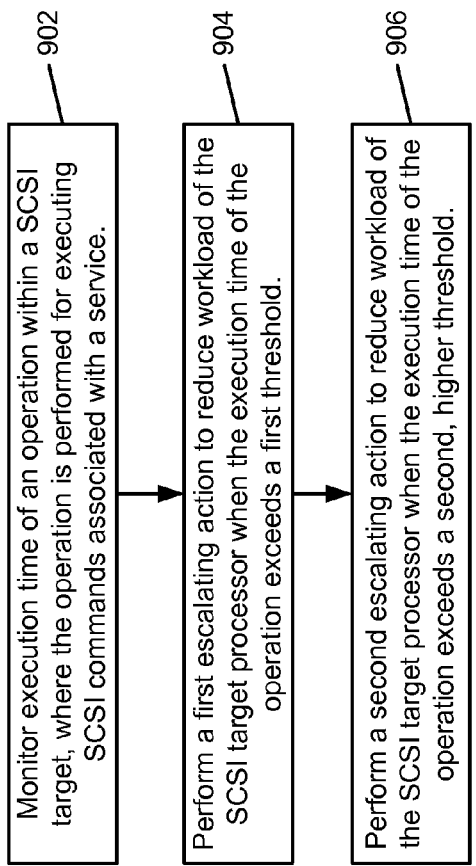
FIG. 9 is a flow diagram illustrating recovering from slow or stuck SCSI commands within a SCSI target processor according to an embodiment of the invention.

FIG. 9 is a flow diagram illustrating recovering from slow or stuck SCSI commands within a SCSI target processor according to an embodiment of the invention. The flow diagram is performed in a SCSI target processor. The SCSI target processor is the processor of a SCSI target, which is communicatively coupled with a SCSI initiator through a set of communication links. In one embodiment, SCSI commands are transmitted between the SCSI initiator and target in compliance with an implementation of a fiber channel over Transmission Control Protocol/Internet Protocol (TCP/IP) (FCIP). The SCSI target support a variety of services such as VTL.

At block 902, the SCSI target processor monitors execution time of an operation within a SCSI target. The operation is performed for executing SCSI commands associated with a service. In one embodiment, the monitoring is performed by a SCSI target management daemon, which coordinates executing SCSI commands at the SCSI target processor. Each operation the service may perform executing SCSI commands associated with the service is associated with a wait duration. At the beginning of the operation, the parameters associated with the operation are saved, and also a timestamp associated with the operation is saved. The SCSI target management daemon then records time elapses since the beginning of the operation.

At block 904, the SCSI target processor performs a first escalating action to reduce workload of the SCSI target processor when the execution time of the operation exceeds a first threshold. If the execution of the operation continues, at block 906, the SCSI target processor performs a second, different escalating action to reduce workload of the SCSI target processor when the execution time of the operation exceeds a second threshold that is higher than the first threshold. Note the first and second thresholds are configurable in one embodiment. Also, in one embodiment at least one of the SCSI initiator and the SCSI target is a deduplicating storage system, and where data in the SCSI initiator is backed up at the SCSI target.

In one embodiment, the first and the second escalating actions are one of the following:

Removing messages at a virtual driver for the service in response to that the operation duration of a monitored operation exceeds a period, where the virtual driver accepts SCSI commands associated with the service and make the SCSI commands available to a file system of the SCSI target;

Removing messages at a SCSI driver for the service in response to that the operation duration of the monitored operation exceeds the period by a first number of times, where the SCSI driver accepts SCSI commands and determines where to route the SCSI commands for further processing;

Removing messages at the virtual driver for a number of services of the services the SCSI target support, including the service with monitored operations in response to that the operation duration of the operation exceeds the period by a second number of times; and Triggering a diagnostic procedure in response to that the operation duration of the operation exceeds the period by a third number of times, where the diagnostic procedure involves more operations than any of the preceding recovering actions.

Note the escalating actions above is in the order of increasing impact to the SCSI target, and they are accompanied by increased length of the operation being ongoing at the SCSI target (thus making SCSI command execution slower or even complete stuck). Thus, the first, second, and the third number of times are in the order of getting bigger. In addition, these numbers do not have to be integers, and they may be fraction numbers.

Also note that while performing the escalating operations to recover from slow and stuck SCSI commands, embodiments of toggling SCSI command acceptance may be utilized to facilitate the recovery process. In one embodiment, the SCSI target halts processing SCSI commands associated with a subset of services that the SCSI target offers (e.g., all other services other than the service with monitored operations) while the first or the second escalating action is being performed. The SCSI target determines a halt duration of halting processing the SCSI commands associated with each halted service. For each halted service, the SCSI target renews processing the SCSI commands associated with the service for a processing period when the halt duration reaches a timeout duration and then halts processing the SCSI commands associated with the service after the processing period expires.

Embodiments of Deduplication

Embodiments of the inventions may be integrated within a deduplication system. Both SCSI initiator and target may contain components performing deduplication functions. In other words, embodiments of inventions may be implemented in a SCSI system, where at least one of the SCSI initiator and the SCSI target is a deduplicating storage system, and where data in the SCSI initiator is backed up at the SCSI target. FIG. 10 is a block diagram illustrating a segment storage engine according to an embodiment of the invention. For example, deduplication storage engine 1000 may be implemented as part of a deduplication storage system as described above, such as deduplication storage engine 107 of FIG. 1. The embodiments of deduplication can be implemented at either primary storage 180 or secondary storage 104 of FIG. 1.

Referring to FIG. 10, in one embodiment, deduplication storage engine 1000 includes file service interface 1002, segmenter 1004, duplicate eliminator 1006, file system control 1008, and storage unit interface 1012. Deduplication storage engine 1000 receives a file or files (or dataset(s)) via file service interface 1002, which may be part of a file system namespace of a file system associated with the deduplication storage engine 1000. The file system namespace refers to the way files are identified and organized in the system. An example is to organize the files hierarchically into directories or folders. File service interface 1002 supports a variety of protocols, including a network file system (NFS), a common Internet file system (CIFS), and a virtual tape library interface (VTL), etc.

The file(s) is/are processed by segmenter 1004 and file system control 1008. Segmenter 1004 breaks the file(s) into variable-length segments based on a variety of rules or considerations. For example, the file(s) may be broken into segments by identifying segment boundaries using a content-based technique (e.g., a function is calculated at various locations of a file, when the function is equal to a value or when the value is a minimum, a maximum, or other value relative to other function values calculated for the file), a non-content-based technique (e.g., based on size of the segment), or any other appropriate technique. In one embodiment, a segment is restricted to a minimum and/or maximum length, to a minimum or maximum number of segments per file, or any other appropriate limitation.

In one embodiment, file system control 1008 processes information to indicate the segment(s) association with a file. In some embodiments, a list of fingerprints is used to indicate segment(s) associated with a file. File system control 1008 passes segment association information (e.g., representative data such as a fingerprint) to an index (not shown). The index is used to locate stored segments in storage units 1010 via storage unit interface 1012. Duplicate eliminator 1006 identifies whether a newly received segment has already been stored in storage units 1010. In the event that a segment has already been stored in storage unit(s), a reference to the previously stored segment is stored, for example, in a segment tree associated with the file, instead of storing the newly received segment. A segment tree of a file may include one or more nodes and each node represents or references one of the deduplicated segments stored in storage units 1010 that make up the file. Segments are then packed by a container manager (not shown) into one or more storage containers stored in storage units 1010. The deduplicated segments may be further compressed using a variation of compression algorithms, such as a Lempel-Ziv algorithm before being stored.

When a file is to be retrieved (for storage application 1014 for example), file service interface 1002 is configured to communicate with file system control 1008 to identify appropriate segments stored in storage units 1010 via storage unit interface 1012. Storage unit interface 1012 may be implemented as part of a container manager. File system control 1008 communicates with an index (not shown) to locate appropriate segments stored in storage units via storage unit interface 1012. Appropriate segments are retrieved from the associated containers via the container manager and are used to construct the requested file. The file is provided via interface 1002 in response to the request. In one embodiment, file system control 1008 utilizes a tree (e.g., a segment tree) of content-based identifiers (e.g., fingerprints) to associate a file with data segments and their locations in storage unit(s). In the event that a segment associated with a given file or file changes, the content-based identifiers will change and the changes will ripple from the bottom to the top of the tree associated with the file efficiently since the appropriate content-based identifiers are easily identified using the tree structure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method comprising:
    initiating a first request to acquire an exclusive lock for a first service daemon of a small computer system interface (SCSI) target to shut down a first service, wherein the SCSI target is communicatively coupled with a SCSI initiator through a set of communication links, wherein the SCSI target offers a plurality of services, wherein each service corresponds to a service daemon, and wherein each service is provided at the SCSI target through executing SCSI commands initiated from the SCSI initiator;
    receiving a first rejection of the exclusive lock for the first request at the first service daemon, wherein the exclusive lock is currently held by a second service daemon corresponding to a second service, and wherein each of the first and the second services belongs to the plurality of services;
    initiating a second request to acquire the exclusive lock for the first service daemon in an attempt to shut down the first service again after a delay period; and
    in response to a second rejection,
        terminating execution of SCSI commands associated with the second service currently possessing the exclusive lock to allow the first service to acquire the lock to shut down the first service.

2. The computer-implemented method of claim 1, further comprising:
    setting a shutdown delay flag associated with the first service in response to receiving the first rejection.

3. The computer-implemented method of claim 1, further comprising:
    restarting the second service daemon corresponding to the second service after a restart period following terminating the execution of SCSI commands associated with the second service; and renewing processing the SCSI commands associated with the second service.

4. The computer-implemented method of claim 1, wherein terminating execution of SCSI commands comprising:
    monitoring execution time of an operation for the second service by the SCSI target;
    performing a first escalating action to reduce workload of the SCSI target processor when the execution time of the operation exceeds a first threshold; and
    performing a second escalating action that is different from the first escalating action to reduce workload of the SCSI target processor when the execution time of the operation exceeds a second threshold, wherein the first threshold is no larger than the second threshold.

5. The computer-implemented method of claim 1, further comprising:
    halting processing SCSI commands associated with a subset of the plurality of services while terminating execution of the SCSI commands associated with the second service currently possessing the exclusive lock to allow the first service to acquire the lock to shut down the first service;
    determining a halt duration of halting processing the SCSI commands associated with each service of the subset of the plurality of services; and
    for each service within the subset of the plurality of services,
        renewing processing the SCSI commands associated with the service for a processing period when the halt duration reaches a timeout duration; and
        halting processing the SCSI commands associated with the service after the processing period expires.

6. The computer-implemented method of claim 1, wherein the delay period is configurable.

7. The computer-implemented method of claim 1, wherein at least one of the SCSI initiator and the SCSI target is a deduplicating storage system, and wherein data in the SCSI initiator is backed up at the SCSI target.

8. A non-transitory computer-readable storage medium having instructions stored therein, which when executed by a processor, cause the processor to perform a method, the method comprising:
- initiating a first request to acquire an exclusive lock for a first service daemon of a small computer system interface (SCSI) target to shut down a first service, wherein the SCSI target is communicatively coupled with a SCSI initiator through a set of communication links, wherein the SCSI target offers a plurality of services, wherein each service corresponds to a service daemon, and wherein each service is provided at the SCSI target through executing SCSI commands initiated from the SCSI initiator;
- receiving a first rejection of the exclusive lock for the first request at the first service daemon, wherein the exclusive lock is currently held by a second service daemon corresponding to a second service, and wherein each of the first and the second services belongs to the plurality of services;
- initiating a second request to acquire the exclusive lock for the first service daemon in an attempt to shut down the first service again after a delay period; and
- in response to a second rejection,
    - terminating execution of SCSI commands associated with the second service currently possessing the exclusive lock to allow the first service to acquire the lock to shut down the first service.

9. The non-transitory computer-readable storage medium of claim 8, wherein the method further comprising:
setting a shutdown delay flag associated with the first service in response to receiving the first rejection.

10. The non-transitory computer-readable storage medium of claim 8, wherein the method further comprising: restarting the second service daemon corresponding to the second service after a restart period following terminating the execution of SCSI commands associated with the second service; and renewing processing the SCSI commands associated with the second service.

11. The non-transitory computer-readable storage medium of claim 8, wherein terminating execution of SCSI commands comprising:
- monitoring execution time of an operation for the second service by the SCSI target;
- performing a first escalating action to reduce workload of the SCSI target processor when the execution time of the operation exceeds a first threshold; and
- performing a second escalating action that is different from the first escalating action to reduce workload of the SCSI target processor when the execution time of the operation exceeds a second threshold, wherein the first threshold is no larger than the second threshold.

12. The non-transitory computer-readable storage medium of claim 8, wherein the method further comprising:
- halting processing SCSI commands associated with a subset of the plurality of services while terminating execution of the SCSI commands associated with the second service currently possessing the exclusive lock to allow the first service to acquire the lock to shut down the first service;
- determining a halt duration of halting processing the SCSI commands associated with each service of the subset of the plurality of services; and
- for each service within the subset of the plurality of services,
    - renewing processing the SCSI commands associated with the service for a processing period when the halt duration reaches a timeout duration; and
    - halting processing the SCSI commands associated with the service after the processing period expires.

13. The non-transitory computer-readable storage medium of claim 8, wherein the delay period is configurable.

14. The non-transitory computer-readable storage medium of claim 8, wherein at least one of the SCSI initiator and the SCSI target is a deduplicating storage system, and wherein data in the SCSI initiator is backed up at the SCSI target.

15. A small computer system interface (SCSI) target comprising:
- a host bus adapter configured to couple with a set of communication links for communicating with a SCSI initiator using SCSI commands; and
- a SCSI target processor performing operations for processing SCSI commands, wherein operations are associated with a plurality of services offered by the SCSI target, and wherein each of the plurality of services corresponds to a service daemon, the SCSI target processor including:
    - a plurality of service daemons, each service daemon configured to manage a service of the plurality of services;
    - a SCSI target management daemon configured to receive a first request to acquire an exclusive lock sent by a first service daemon to shut down a first service;
    - the SCSI target management daemon further configured to send a first rejection of the exclusive lock for the first request after determining that the exclusive lock is currently held by a second service daemon corresponding to a second service, wherein each of the first and the second services belongs to the plurality of services;
    - the SCSI target management daemon further configured to receive a second request to acquire the exclusive lock for the first service daemon in an attempt to shut down the first service again after a delay period;
    - the SCSI target management daemon further configured to send a second rejection; and
    - the SCSI target management daemon further configured to terminate execution of SCSI commands associated with the second service currently possessing the exclusive lock to allow the first service to acquire the lock to shut down the first service.

16. The SCSI target of claim 15, wherein the SCSI target management daemon further configured to set a shutdown delay flag associated with the first service in response to receiving the first rejection.

17. The SCSI target of claim 15, further comprising a process monitoring daemon within the SCSI target processor, wherein the process monitoring daemon is configured to: restart the second service daemon corresponding to the second service after a restart period following terminating the execution of SCSI commands associated with the second service; and renew processing the SCSI commands associated with the second service.

18. The SCSI target of claim 15, wherein terminating execution of SCSI commands comprising:

monitoring execution time of an operation for the second service by the SCSI target;

performing a first escalating action to reduce workload of the SCSI target processor when the execution time of the operation exceeds a first threshold; and performing a second escalating action that is different from the first escalating action to reduce workload of the SCSI target processor when the execution time of the operation exceeds a second threshold, wherein the first threshold is no larger than the second threshold.

19. The SCSI target of claim 15, wherein the SCSI target management daemon further configured to:

halt processing SCSI commands associated with a subset of the plurality of services while terminating execution of the SCSI commands associated with the second service currently possessing the exclusive lock to allow the first service to acquire the lock to shut down the first service;

determine a halt duration of halting processing the SCSI commands associated with each service of the subset of the plurality of services; and for each service within the subset of the plurality of services, renew processing the SCSI commands associated with the service for a processing period when the halt duration reaches a timeout duration; and halt processing the SCSI commands associated with the service after the processing period expires.

20. The SCSI target of claim 15, wherein the delay period is configurable.

* * * * *